United States Patent
Baker et al.

(10) Patent No.: US 6,485,858 B1
(45) Date of Patent: Nov. 26, 2002

(54) GRAPHITE NANOFIBER CATALYST SYSTEMS FOR USE IN FUEL CELL ELECTRODES

(75) Inventors: R. Terry K. Baker, Mansfield, MA (US); Nelly M. Rodriguez, Mansfield, MA (US)

(73) Assignee: Catalytic Materials

( * ) Notice: Subject to any disclaimer, the term of this patent is extended or adjusted under 35 U.S.C. 154(b) by 70 days.

(21) Appl. No.: 09/643,418

(22) Filed: Aug. 22, 2000

Related U.S. Application Data

(60) Provisional application No. 60/150,371, filed on Aug. 23, 1999.

(51) Int. Cl.[7] .............................. H01M 4/86; H01M 4/96
(52) U.S. Cl. ....................................................... 429/40
(58) Field of Search ............................ 429/40–43, 27; 427/115; 502/101

(56) References Cited

U.S. PATENT DOCUMENTS

| | | | |
|---|---|---|---|
| 4,263,376 A | 4/1981 | Blurton | 429/42 |
| 4,851,377 A | 7/1989 | Breault | 502/101 |
| 5,110,693 A | 5/1992 | Friend et al. | 429/40 |
| 5,277,996 A | 1/1994 | Marchetti et al. | 429/44 |
| 5,413,866 A | 5/1995 | Baker et al. | 423/447.2 |
| 6,183,898 B1 * | 2/2001 | Koschany et al. | |

OTHER PUBLICATIONS

Steigerwalt et al. ("A Pt–Ru/Graphitic Carbon Nanofiber Nanocomposite Exhibiting High Relative Performance as a Direct–Methanol Fuel Cell Anode Catalyst", J. Phys. Chem. B, 2001, 105, 8097–8101).*

Colin Park and R. Terry K. Baker ("Catalytic Behavior of Graphite Nanofiber Supported Nickel Particles. 2. The Influence of the Nanofiber Structure", J. Phys. Chem. B. 1998, 102, 5168–5177).*

* cited by examiner

*Primary Examiner*—Patrick Ryan
*Assistant Examiner*—Susy Tsang-Foster
(74) *Attorney, Agent, or Firm*—Henry E. Naylor

(57) ABSTRACT

Graphite nanofiber catalyst systems for use in the production of fuel cell electrodes. The graphite nanofibers are comprised of graphite sheets aligned either substantially perpendicular or substantially parallel to the longitudinal axis of the nanofiber. The graphite nanofibers contain exposed surfaces of which at least about 95% of the exposed surfaces are comprised of edge sites.

18 Claims, 1 Drawing Sheet

Stacking of Graphite Layers in "Platelet" GNF

Enlargment of the Marked Region (Left)

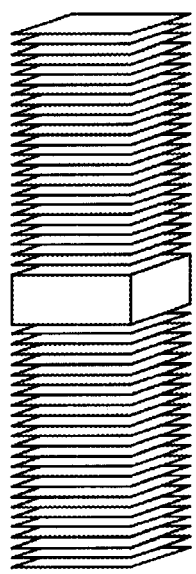
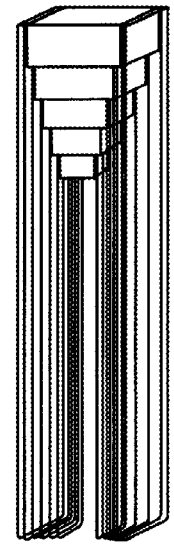
*FIG. 1A*
*FIG. 1B*
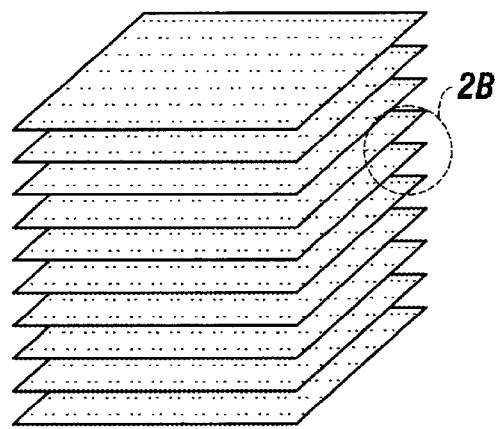
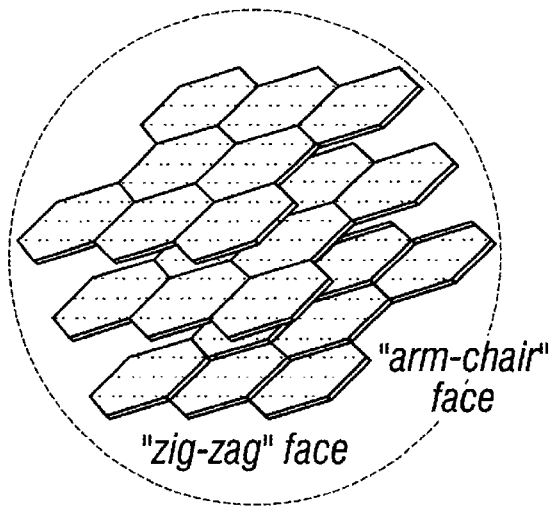
Stacking of Graphite
Layers in "Platelet" GNF
*FIG. 2A*
Enlargment of the
Marked Region (Left)
*FIG. 2B*

GRAPHITE NANOFIBER CATALYST SYSTEMS FOR USE IN FUEL CELL ELECTRODES

This application claims the benefit of Provisional application No. 60/150,371, filed Aug. 23, 1999.

FIELD OF THE INVENTION

The present invention relates to graphite nanofiber catalyst systems for use in the production of fuel cell electrodes. The graphite nanofibers are comprised of graphite sheets aligned either substantially perpendicular or substantially parallel to the longitudinal axis of the nanofiber.

BACKGROUND OF THE INVENTION

Electrochemical fuel cells are devices that can directly convert chemical (fuel) into electrical energy and are about three times more efficient than thermal conversion systems. Of the various types of fuel cells, the proton exchange membrane (PEM) is preferred for transportation (automobiles) and small portable device (telephones, laptop computers) applications because of their lightweight and low temperature operation. They also offer quick startup, they operate instantly at full capacity, and they rapidly adjust to variable power demands. In electrochemical fuel cells employing hydrogen as the fuel and oxygen as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

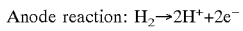

Anode reaction: $H_2 \rightarrow 2H^+ + 2e^-$

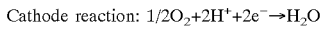

Cathode reaction: $1/2 O_2 + 2H^+ + 2e^- \rightarrow H_2O$

In electrochemical fuel cells employing methanol as the fuel supplied to the anode (so-called "direct methanol" fuel cells) and an oxygen-containing oxidant stream, such as air (or substantially pure oxygen) supplied to the cathode, the methanol is oxidized at the anode to produce protons and carbon dioxide. Typically, the methanol is supplied to the anode as an aqueous solution or as a vapor. The protons migrate through the ion exchange membrane from the anode to the cathode, and at the cathode electrocatalyst layer, oxygen reacts with the protons to form water. The anode and cathode reactions in this type of direct methanol fuel cell are shown in the following equations:

Anode reaction: $CH_3OH + H_2O \rightarrow 6H^+ + CO_2 + 6e^-$

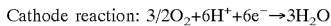

Cathode reaction: $3/2 O_2 + 6H^+ + 6e^- \rightarrow 3H_2O$

Platinum supported on carbon, typically a high temperature (graphitized) treated carbon, has been the combination of choice as the catalyst system since both platinum and carbon are resistant to oxidation at the operation conditions of a PEM fuel cell. Although there are still problems to be addressed with this technology, one of the major disadvantages is the initial cost of the system with regard to the membrane and the high amount of noble metal catalyst required for the electrodes. A large fraction of the noble metal catalyst is wasted and because of sintering (increase in particle size) and because of metal particle location with respect to the membrane.

When metal catalyst particles are dispersed on conventional carbon materials, even on conventional graphitic materials, they typically exhibit relatively weak interactions with the basal plane regions of the carbon resulting in the formation of relatively large globular entities (like oil and water). Most of the metal atoms are contained in the globular entities and are consequently unavailable to perform the desired catalytic reaction. It would be highly desirable if the catalytic particles could be deposited in such a manner that they were spread in the form of a thin film over the surface of the carbon. The resulting catalyst-containing structure would give rise to the most efficient use of catalytic metal and as a consequence, it would be possible to not only optimize the catalytic efficiency of the electrode system, but it would also be possible to reduce catalyst loading.

SUMMARY OF THE INVENTION

In accordance with the present invention, there is provided a fuel-cell electrode comprised of a dispersion of one or more noble metals, alloys or bimetallics thereof, on graphite nanofibers characterized as: a) comprised of graphite sheets that are substantially parallel or perpendicular to the longitudinal axis of the nanofiber; and b) having at least about 95% of their exposed surfaces comprised of edge regions.

In a preferred embodiment of the present invention, the graphite nanofiber is further characterized as possessing: (i) a surface area from about 0.2 to 3,000 m²/g as determined by $N_2$ adsorption at −196° C., (ii) a crystallinity from about 50% to about 100%, and (iii) a distance from about 0.335 nm to about 0.67 nm between the graphite sheets.

In a preferred embodiment the noble metal is selected from the group consisting of Pt, Pd, Rh, Re and mixtures thereof.

In yet another preferred embodiment of the present invention, at least a portion of the exposed edges are capped by the substitution of heteroatoms, such as phosphorous and boron oxides.

In another preferred embodiment, at least a portion of the edges of the graphite nanofiber contain a functional group selected from the group consisting of C—OH, C=O, C—O—C, and COOH.

In still another embodiment of the present invention, the graphite nanofibers are characterized as having a crystallinity greater than about 90%.

In yet other preferred embodiments, the carbon nanofibers are characterized as having: (i) a surface area from about 50 to 800 m²/g; and (ii) a crystallinity from about 95% to 100%.

In still another preferred embodiment of the present invention, there is provided a hydrogenation catalyst comprised of said carbon nanofibers and one or more hydrogenation-active metals, typically those from Groups VI and VIII of the Periodic Table of the Elements.

BRIEF DESCRIPTION OF THE FIGURES

FIGS. 1a and b hereof are simplified drawings of the types of arrangements of graphite sheets that may be present in the nanofibers used in this invention. FIG. 1a shows the graphite sheets substantially perpendicular to the longitudinal axis of the nanofiber, and FIG. 1b shows the sheets substantially parallel to the longitudinal axis of the nanofiber.

FIG. 2a is schematic representation of the stacking order of graphite sheets in the graphite nanofibers of the present invention. FIG. 2b is a detailed representation of the difference in carbon-atom arrangement in the prismatic faces.

DETAILED DESCRIPTION OF THE INVENTION

The graphite nanofibers of the present invention possess novel structures in which the graphite sheets are aligned in a direction either substantially perpendicular, or substantially parallel to the fiber axis and designated "platelet", and "ribbon", respectively. In addition, the exposed surfaces of the nanofibers are comprised of at least about 95% edge regions, in contrast to conventional graphites that are comprised almost entirely of basal plane regions (about 95%) and very little edge sites (about 5%).

The graphite nanofibers of the present invention are further characterized as having: (i) a surface area from about 0.2 to 3,000 $m^2/g$, preferably from about 50 to 800$m^2/g$, more preferably from about 100 to 700 $m^2/g$, and most preferably from about 250 to 350 $m^2/g$, which surface area is determined by $N_2$ adsorption at –196° C.; (ii) a crystallinity from about 50% to about 100%, preferably from about 75% to 100%, most preferably from about 90% to 100%, and ideally at least about 95%; (iii) interstices of about 0.335 nm to about 0.67 nm, preferably from about 0.335 nm to about 0.40 nm, and most preferably about 0.335 nm to about 0.347 nm; and surfaces of said nanofiber that define said interstices, which surfaces have sorption properties with respect to hydrogen. The nanofibers used in the present invention can also have widths from about 0.75 nm to about 1,000 nm, preferably from about 0.75 nm to about 500 nm, and more preferably from about 0.75 nm to 200 nm. It is to be understood that "nm" means nanometer. Suitable intercalation methods can expand the interlayer spacing up to values of about 1.025 nm. The surface area of the carbon nanofibers can be increased by careful activation with a suitable etching agent, such as carbon dioxide, steam, or the use of a selected catalyst, such as an alkali or alkaline-earth metal.

The preferred layered nanostructures are graphite nanostructures. In its conventional form, graphite consists almost entirely of basal plane regions (about 95%) with very little edge regions (about 5%). On the other hand, certain types of graphite nanostructures, such as the graphite nanofibers of the present invention, are the opposite; they are comprised of at least about 95% edges and about 5% basal planes. It is well known in the art that metal particles can undergo substantial modifications in catalytic performance when dispersed on different types of support media. Indeed, this concept has been proven for the case where nickel particles were dispersed onto a graphite nanofiber and the system subsequently used for a series of catalytic hydrogenation reactions. Similar performance for the hydrogenation of selected hydrocarbons was realized with 5% nickel on graphite nanofiber catalyst compared to a 25% loading of nickel on γ-alumina.

The carbon nanofibers of the present invention are produced by growing them with the use of a suitable catalyst in the presence of an effective carbon-containing compound. They are preferably grown from unsupported catalytic metal powders, although they can also be grown on a conductive substrate onto which catalytic metal particle precursors have been deposited. Non-limiting examples of suitable conductive substrate materials from which the carbon nanofibers may be grown include: graphitic materials, particularly graphite nanofibers; and metallic substrates, such as a metallic wire, mesh, or screen. If a substrate is used, it is preferred that the substrate be in a form selected from the group consisting of sheet, fiber, and powder. It is also within the scope of the present invention that a mixture of metal powders be used. As previously mentioned, it is most preferred in the practice of the present invention that the nanofibers be grown without the use of a substrate. A process for depositing the catalytic metal of the substrate can be found in U.S. Pat. No. 5,413,866, which is incorporated herein by reference.

Catalysts suitable for growing the graphite nanofibers of the present invention include Group VIII metals, preferably Fe and Ni-based catalysts. The catalysts are typically alloys or multi-metallics comprised of a first metal selected from the metals of Group IB of the Periodic Table of the Elements, and a second metal selected from the group consisting of Fe, Ni, Co, Zn, and mixtures thereof. Group IB metals are Cu, Ag, and Au. Preferred are Cu and Ag with Cu being the most preferred. The Group IB metal is present in an amount ranging from about 0.5 to 99 at. % (atomic %). A third metal may also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of copper in combination with Fe, Ni, or Co. More preferred is copper, in combination with Fe and Ni, from an economic point of view. That is, a catalyst in which Fe is used in place of a portion of the Ni would be less expensive than a catalyst comprised of Cu in combination with only Ni.

The structural forms of the nanofibers of the present invention can be controlled to a significant degree. For example, use of a catalyst that is comprised of an Fe: Cu bimetallic powder will produce predominantly straight, or "platelets", nanofibers, having their graphite sheets substantially perpendicular to the longitudinal axis of the nanofibers when grown in a mixture of $CO/H_2$. In fact, such as a structure is capable of having substantially 100% exposed edges. The preferred bimetallic catalyst will contain up to about 99 atomic %, even up to about 70 atomic %, or even up to about 50 atomic %, preferably up to about 30 atomic %, more preferably up to about 10 atomic %, and most preferably up to about 5 atomic % copper, with the remainder being a Fe.

Reacting the catalyst in a heating zone with the vapor of a suitable carbon-containing compound, for an effective amount of time, produces the nanofibers of the present invention. By an effective amount of time, we mean, that amount of time needed to produce the desired nanofiber structural arrangement. This amount of time will, generally, be from about 10 minutes to about 8 hours, preferably from about 10 minutes to about 6 hours, more preferably from about 15 minutes to 2 hours, and most preferably from about 15 minutes to about I hour. The heating zone is maintained at a temperature from the decomposition temperature of the carbon-containing compound to the deactivation temperature of the catalyst. Generally, this temperature will range from about 500° C. to about 700° C., and preferably from about 550° C. to about 650° C.

Carbon-containing compounds suitable for use in growing the nanofibers of the present invention are compounds composed mainly of carbon atoms and hydrogen atoms, although carbon monoxide may also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include carbon monoxide, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene; carbon monoxide and hydrogen.

If not already present in the desired gas mixture, it may be desirable to have an effective amount of hydrogen present in the heating zone. By an effective amount, we mean that minimum amount of hydrogen that will maintain a clean catalyst surface (free of carbon residue), however, not so much that will cause excessive hydrogasification (or burn-off) of carbon from the nanofibers and/or fiber substrate structure, if present. Generally, the amount of hydrogen present will range from about 5 to 40 vol. %, preferably from about 10 to 30 vol. %, and most preferably from about 15 to 25 vol. %. Hydrogen serves two competing functions. For example on the one hand, it acts as a cleaning agent for the catalyst and on the other hand it hydrogasifies, or causes carbon burn-off, of the carbon structure. For some catalyst systems, such as the preferred Cu:Fe bimetallic, the hydrogasification reaction is relatively slow, thus, an effective amount of hydrogen is needed to clean the catalyst in order to keep it clean of carbon residue and maintain its' activity. Little or no hydrogen is needed in the heating zone for other catalyst systems, such as Cu:Ni, where the activity is so high that excessive hydrogasification occurs. The Cu:Ni is so active that it utilizes essentially all of the carbon deposited thereon to grow nanofibers, and thus, there is generally no carbon residue to clean off.

After the nanofibers are grown, it may be desirable to treat the final structure with an aqueous solution of an inorganic acid, such as a mineral acid, to remove any excess catalyst particles. Non-limiting examples of mineral acids that can be used include sulfuric acid, nitric acid, and hydrochloric acid. Preferred is hydrochloric acid.

Further, the edges of the graphite sheets may be etched with an appropriate etching agent, preferably carbon dioxide, steam, or a suitable catalyst such as an alkali or alkaline-earth metal in order to increase the surface area. In addition, the edges of the graphite sheets can also be treated with an oxidizing agent such as hot nitric acid, potassium permanganate, hydrogen peroxide, et cetera in order to introduce functional groups such as C—OH, C=O, C—O—C, and COOH that can in turn anchor metal particles and prevent sintering. The nanofibers of the present invention are also suitable for the storage of other small gas molecules, such as He, $O_2$, NO, $N_2O$, $NH_3$, CO, $CO_2$, and $CH_4$, and which can also be stored between the platelets.

The graphite nanofibers of the present invention are classified according to the arrangement of the graphite sheets. The "platelet" structure (FIG. 1a) is where the graphite sheets are substantially perpendicular to the longitudinal axis of the nanofiber. The "ribbon" structure (FIG. 1b) is where the alignment of the graphite sheets is substantially parallel to the longitudinal axis of the nanofiber. The carbon atoms at the graphite edge regions of the nanofibers can adopt one of two arrangements, the so-called "armchair" or "zigzag" conformations, as shown in FIG. 2 hereof. In the "platelet" type of arrangement the nanofiber exposes an equivalent number of "armchair" and "zigzag" faces to the gas phase. On the other hand, the surface of the "ribbon" nanofiber consists of a relatively large fraction of "zigzag" faces. When nickel particles are dispersed on these two types of nanofiber structures an entirely different pattern of catalytic behavior is achieved. When boron oxide, an additive that preferentially blocks the "zig-zag" faces of the graphite nanofibers was introduced to the graphite nanofiber, the activity of 5wt. % Ni supported on these carbons towards the conversion of ethylene to various products was completely suppressed. On the other hand, when phosphorous, an "armchair" blocking agent was added to these carbons, the reactivity of 5wt. % Ni achieved the maximum value. This difference, in catalytic performance, of the metal particles may be attributed to the different geometry adopted by the metal crystallites on the edges of nanofiber. The graphite sheets of the nanofiber-support media may act as templates for the dispersed metal crystallites, which adopted a specific geometry that is dictated by their particular site location. The active state of nickel is one where the metal particles are preferentially located on the "zigzag" faces of the nanostructure surfaces, this is consistent with observations that in a reducing environment nickel preferentially wets and spreads along the "zigzag" faces of graphite, leading to an epitaxial relationship between the metal and the substrate.

As previously stated, prior to the graphite nanofibers being used as a support medium for the catalytic metal, preferably a noble metal, it is essential that the nanofiber be demineralized in a dilute acid. While a standard incipient wetness technique can be used to introduce the desired catalytic metal precursor salt, this operation must be conducted in a non-aqueous media. This is because, in the "as prepared condition" the graphite nanofibers are hydrophobic in nature and poor metal dispersion is achieved if one used water as the solvent. Electrochemical reduction means can also be used to deposit the desired catalytic metal onto the nanofibers. It is also necessary to select a metal precursor salt that undergoes oxidation at a relatively low temperature in order to avoid gasification of the nanofiber support during the calcination step. For the same reasons a corresponding set of precautions must also be followed during reduction in hydrogen. With these safeguards no loss of support material is recorded during the catalyst preparation procedure.

The graphite nanofibers of the present invention can be used to support any metal suitable for use in electrochemical fuel cells. Preferred metals are the transition metals, more preferred are the Group VIII metals. The Group VIII metals can be either non-noble, such as Ni, Co, and Fe or the noble metals such as Pt, Pd, Rh, Ir, and Re, and mixtures thereof. The preferred catalytic metals are the noble metals, more preferably Pt and Pd. If a Group VIII non-noble metal is used it can be used with one or more Group VI metals, such as molybdenum or tungsten. The concentration of metal on graphite nanofiber support will an effective amount. That is, at least that amount which will produce the desired catalytic effect. This concentration will typically be from about 2 wt. % to about 30 wt. %, preferably from about 5 wt. % to about 20 wt. %, based on the total weight of graphite nanofiber plus metal.

The noble metal catalytic components can be introduced onto the graphite nanofiber surface by any suitable method. A preferred method is the so-called "incipient wetness" technique wherein a soluble noble metal salt is dissolved in a suitable solvent. An aqueous or non-aqueous solutions (methanol, ethanol, butanol) of a suitable metal salt (nitrate of chloride) containing the desired concentration of metal so as to produce a mixture of 0.5 to 30% by weight of metal is slowly added to the graphite nanofiber and constantly stirred for up to eight hours in order to ultimately achieve a uniform dispersion of very small metals particles.

It is within the scope of this invention that the graphite nanofiber be one wherein the "zigzag" or "arm-chair" edges are alternatively capped by the substitution or introduction of heteroatoms, such as phosphorous, boron oxide, etc. Also, it is preferred that the catalytic metal particles adopt a well-defined geometry as determined by the arrangement of atoms at the edges of the support. Further, the catalyst system where the graphite nanofiber supported catalytic particles are in the form of a "thin-film", or in a "hexagonal shape", or in a flat "pill-box" configuration, or any other arrangement where the width-to-thickness ratio of the particle is very large.

The practice of the present invention leads to a catalyst system where noble metal is more efficiently deposited onto a graphite nanofiber support, which results in a substantially lower metals loading when compared to conventional systems. Further, the catalyst systems of the present invention are such that the graphite nanofiber has a relatively high electrical conductivity and where only the edges are in contact with the catalytic metal particles and, as such, can either donate or remove electrons to, and from, the metal. The nanofiber catalyst systems of the present invention are used preferably for electrodes in fuel cells. For example, they are used for dissociation of hydrogen at the cathode and/or the dissociation of oxygen at the anode of the fuel cell.

Also, the graphite nanofiber catalyst system may also contain the noble metal and/or alloy particles inserted between two adjacent graphite sheets within the graphite nanofiber, a configuration that will effectively prevent particle sintering due to growth and coalescence. Because of the ability to dissociate hydrogen, the catalytic nanostructure systems of the present invention can be used as hydrogenation catalysts. Further, because of the affinity towards hydrogen the catalyst nanostructures of the present invention can. be used to dehydrogenate organic compounds such as, but not limited to, alkanes.

The electrode can be made by any conventional technique. For example, the electrode can be comprised of a molded or extruded composite of suitable binders and the graphite nanofibers of the present invention with the catalytic metal deposited thereon. The catalytic metal can also be deposited on the graphite nanofiber prior to the composite being formed into an electrode. Also, the electrode can be comprised of various layers of conductive material, the outer most layer of which will be the graphite nanofiber with catalytic metal. Non-limiting examples of techniques for producing electrochemical electrodes can be found in U.S. Pat. Nos. 5,277,996; 4,851,377; and 4,263,376 all of which are incorporated herein by reference.

This invention will be illustrated in more detail with reference to the following examples that should not be construed to be limiting the scope of the invention.

EXAMPLES

General Conditions

The preferred carbon nanofibers of the present invention were prepared from the metal catalyzed decomposition of either carbon monoxide/hydrogen or ethylene/hydrogen mixtures at temperatures ranging from 500° to 700° C. according to methods that have been described previously. Prior to use in electrochemical applications, the nanofibers were treated in dilute hydrochloric acid for a period of at least 7 days in order to remove the metal particles used in the growth process. The nanofibers were then rinsed in deionized water at room temperature and dried at 110° C. in air.

Following the purification steps, platinum was introduced onto the respective nanofibers via a conventional incipient wetness technique using diamine-platinum nitrate as the precursor salt dissolved in ethanol. The concentration of the platinum salt was calculated so as to produce a final catalyst consisting of 5 wt. % of metal on each type of carbon nanofiber. The impregnated graphite nanofibers were calcined in flowing air at 250° C. for 4 hours in order to convert the platinum salt to the metal oxide state, and then reduced in a 10% hydrogen/helium mixture at 300° C. for 20 hours. The reduced catalyst samples were passivated in 2% carbon dioxide/helium at room temperature before removal from the reactor.

The performance of the graphite nanofiber supported platinum samples as electrocatalysts for the methanol oxidation reaction was compared to that of three industrial catalysts purchased from E-TEK, Inc. These catalysts consisted of 10, 20 and 30 wt. % platinum supported on XC-72 Vulcan carbon (a carbon black), respectively. In addition, samples of 5 and 30 wt. % platinum on SC-72 Vulcan carbon were prepared using an incipient wetness method in order to ascertain any variations in behavior induced by different preparation techniques.

The characteristics and sizes of the platinum particles dispersed on the various carbon supports were determined by high resolution transmission electron microscopy. These examinations were conducted in a JEOL 2000 EXII instrument equipped with a high resolution pole piece capable of giving a lattice resolution of 0.18 nm. Surface area measurements of the samples were carried out in a Coulter 100 CX Omnisorp unit using nitrogen adsorption at −196° C.

Electrochemical studies were performed in a Gamry potentiostat using the carbon supported platinum samples as the working electrode, platinum gauze as the auxiliary electrode and a saturated potassium chloride calomel as the reference electrode. The working electrodes were prepared according to the following protocol: Prior to use, a commercially available glassy carbon electrode was polished with a fine grain alumina powder. Approximately 25 mg of a given carbon supported catalyst of a desired loading placed onto the surface of the electrode and the solvent permitted to evaporate. In order to bind the carbon supported metal catalyst to the electrode a drop of a polyacrylic acid/methanol solution was placed onto the sample and the solvent allowed to evaporate. Cyclic voltammetry experiments consisted of scanning from 0 to 1.3 V to complete the cycle. A scan rate of 100 mV/s (millivolts per second) was used throughout these experiments and data points recorded every 2 mV. A blank voltamogram was performed with each fresh electrode at the specified reaction temperature in 0.5M sulfuric acid. In a typical experiment, the activities of the carbon supported platinum catalysts fro the oxidation of methanol were compared at a given temperature in 0.5M $H_2SO$/0.5 M methanol solution.

Example 1

A detailed examination of the graphite nanofiber (GNF) supported catalysts by high resolution transmission electron microscopy revealed the existence of major differences in the morphological characteristics of the platinum particles. The graphite nanofiber-supported particles were found to adopt a thin, flat, hexagonal shaped form; characteristics that are generally associated with the establishment of a strong metal-support interaction. In contrast, the metal particles dispersed on the less ordered Vulcan carbon support acquired a dense globular geometry, features that are consistent with a weak metal-support interaction. In this context, mention should be made of the behavior of dispersed platinum on the basal plane regions of single crystal graphite, where it was found that the particles adopt a 3-D globular morphology and as such, are deemed to also exhibit a weak metal-support interaction with these particular surface sites.

Example 2

In this series of experiments, suitable transmission specimens were prepared by ultrasonic dispersion of a small amount of a given catalyst in isobutanol and then application of a drop of the supernatant to a holey carbon support grid. From examination of the specimens in the transmission electron micrograph, it was possible to determine the average platinum particle size of the various catalyst samples. These values are presented in Table I below.

TABLE I

Average sizes of Pt particles on the various carbon supported metal catalysts

| Material | Average Pt. Particle Size |
|---|---|
| 10 wt. % Pt/Vulcan (E-TEK) | 1.7 |
| 20 wt. % Pt/Vulcan (E-TEK) | 2.9 |
| 30 wt. % Pt/Vulcan (E-TEK) | 4.3 |
| 30 wt. % Pt/Vulcan | 4.1 |
| 5 wt. % Pt/"platelet" GNF | 2.7 |
| 5 wt. % Pt/"ribbon" GNF | 2.4 |

Example 3

In a series of electrochemical reactions the activities of the various carbon supported platinum catalysts for methanol oxidation were compared in the presence of a 0.5 M $H_2SO_4$/0.5 M methanol solution at 40° C. From the data, presented in Table II below, it is apparent that the performance of 5 wt. % Pt on Vulcan carbon was $\frac{1}{10}$ and $\frac{1}{20}$ of that measured for an equivalent metal loading on "platelet" graphite nanofiber and "ribbon" graphite nanofiber, respectively. These high values were only matched upon increasing the metal loading on Vulcan to a 30 wt. % level. Since the electrochemical oxidation of methanol only takes place at a useful rate in to this point in time been a requirement in order to improve the performance of direct methanol fuel cells. Inspection of the data presented in Table II below clearly indicates that it is possible to decrease the metal loading and at the same time increase the current by using the graphite nanofibers of the present invention instead of the high platinum loadings necessary when using conventional carbon materials.

TABLE II

Measured values of current (Amps) during methanol oxidation in the presence of various Pt/carbon catalysts at 80° C.

| | Platinum Loading (wt. %) | | | |
|---|---|---|---|---|
| Carbon Support | 5 | 10 | 20 | 30 |
| Vulcan GNF | 0.0023 | 0.0033 | 0.03 | 0.0442 |
| Platelet GNF | 0.0249 | — | — | — |
| Ribbon GNF | 0.0448 | — | — | — |
| Herringbone GNF | 0.0000 | | | |

Example 4

In a further set of experiments involving the electrochemical oxidation of methanol the effect of increasing the temperature from 25° to 80° C. in approximately 10° C. increments was investigated. In each system, the same electrode assembly was used for the entire temperature range in order to ensure that the catalyst surface coverage of the glassy carbon electrode remained constant. The electrode was initially treated in 0.5 M $H_2SO_4$ as a blank and then 0.5 M methanol added to the system. Table III below shows the change in activity, expressed as the MeOH oxidation current (Amps) as a function of the reaction temperature for various carbon supported platinum catalyst.

TABLE III

MeOH Oxidation Current (Amps)

| | Temperature ° C. | | | | | |
|---|---|---|---|---|---|---|
| Catalyst | 25 | 35 | 45 | 60 | 70 | 80 |
| 30% Pt/ Vulcan Carbon | 0.0043 | 0.0072 | 0.0109 | 0.0237 | 0.0333 | 0.0442 |
| 5% Pt/ Platelet GNF | 0.0015 | 0.0039 | 0.0060 | 0.0115 | 0.0217 | 0.0249 |
| 5% Pt/ Ribbon GNF | 0.0035 | 0.0052 | 0.0101 | 0.0172 | 0.0243 | 0.0448 |
| 5% Pt/ Ribbon/ Herringbone GNF | 0.0000 | 0.0000 | 0.0000 | 0.0000 | 0.0000 | 0.0000 |

Example 5

In another series of experiments the performance of selected carbon supported catalysts was examined for the electrochemical oxidation of methanol using various starting concentrations of the alcohol and maintaining the reaction temperature constant at 35° C. Each electrode was initially treated in 0.5 M $H_2SO_4$ as a blank and then predetermined quantities of methanol were added to the system. The data presented in Table IV below indicates that the activities of the carbon supported platinum exhibit a regular increase as the methanol concentration is progressively raised. It is also evident that the 5 wt. % Pt/graphite nanofiber systems exhibit superior activity to that displayed by a 10% platinum/Vulcan carbon sample.

TABLE IV

MeOH Oxidation Current (Amps)

| | MeOH Concentration (moles/L) | | | | |
|---|---|---|---|---|---|
| Catalyst | 0.1 | 0.2 | 0.5 | 0.8 | 1.0 |
| 10% Pt/Vulcan Carbon | 0.0009 | 0.0009 | 0.0011 | 0.0012 | 0.0014 |
| 5% Pt/Platelet GNF | 0.0027 | 0.0030 | 0.0039 | 0.0047 | 0.0050 |
| 5% Pt/Ribbon GNF | 0.0028 | 0.0035 | 0.0052 | 0.0066 | 0.0076 |

What is claimed is:

1. An electrode for an electrochemical fuel cell comprised of one or more noble metals dispersed on graphite nanofibers comprised of graphite sheets, which graphite sheets are oriented substantially perpendicular or parallel to the longitudinal axis of the nanofiber and wherein said graphite nanofiber contains exposed surfaces and wherein at least about 95% of said exposed surfaces are comprised of edge sites.

2. The electrode of claim 1 wherein the graphite nanofiber is further characterized as having a distance of about 0.335 nm to about 0.67 nm between graphite sheets.

3. The electrode of claim 1 when the graphite nanofiber has crystallinity from about 90 to 100%.

4. The electrode of claim 3 wherein the crystallinity is from about 95 to 100%.

5. The electrode of claim 1 wherein the noble metal is selected from the group consisting of Pt, Pd, Ru, and Ir.

6. The electrode of claim 5 wherein two noble metals are present.

7. The electrode of claim 6 wherein the two noble metals are Pt and Ru.

8. The electrode of claim 5 wherein the noble metal is Pt.

9. The electrode of claim 1 wherein the concentration of noble metal on said graphite nanofiber is from about 2 wt. % to about 30 wt. %, based on the total weight of the graphite nanofibers plus metal.

10. The electrode of claim 9 wherein the concentration of noble metal on said graphite nanofiber is from about 5 wt. % to about 20 wt. %, based on the total weight of the graphite nanofibers plus metal.

11. An electrochemical fuel cell comprising an anode, a cathode, and an electrolyte located between the anode and cathode wherein the anode, cathode, or both are comprised of one or more noble metals dispersed on graphite nanofibers comprised of graphite sheets, which graphite sheets are oriented substantially perpendicular or parallel to the longitudinal axis of the nanofiber and wherein said graphite nanofiber contains exposed surfaces and wherein at least about 95% of said exposed surfaces are comprised of edge sites.

12. The electrochemical fuel cell of claim 11 wherein the graphite nanofiber is further characterized as having a distance of about 0.335 nm to about 0.67 nm between graphite sheets.

13. The electrochemical fuel cell of claim 11 wherein the noble metal is selected from the group consisting of Pt, Pd, Ru, and Ir.

14. The electrochemical fuel cell of claim 13 wherein two noble metals are present.

15. The electrochemical fuel cell of claim 14 wherein the two noble metals are Pt and Ru.

16. The electrochemical fuel cell of claim 13 wherein the noble metal is Pt.

17. The electrochemical fuel cell of claim 11 wherein the concentration of noble metal on said graphite nanofiber is from about 2 wt. % to about 30 wt. %, based on the total weight of the graphite nanofibers plus metal.

18. The electrochemical fuel cell of claim 16 wherein the concentration of noble metal on said graphite nanofiber is from about 2 wt. % to about 30 wt. %, based on the total weight of the graphite nanofibers plus metal.

* * * * *